Nov. 19, 1929.                P. G. PEIK                1,736,089
                     AUTOMOBILE CONTROL MECHANISM
                         Filed April 22, 1927
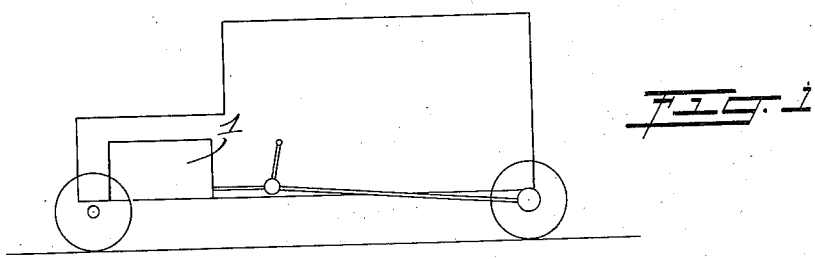
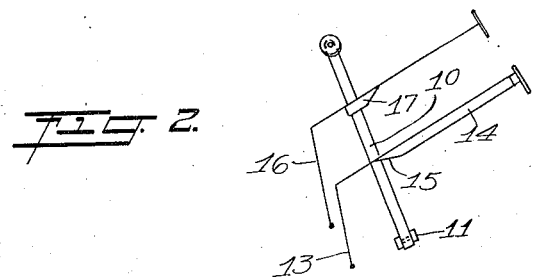
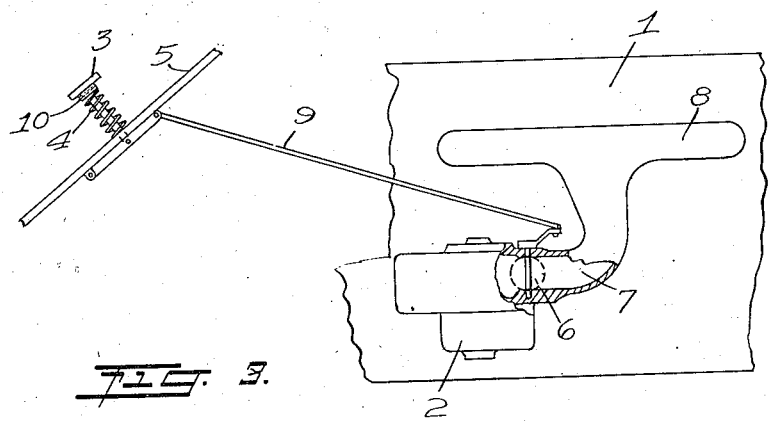
INVENTOR
P.G. PEIK
BY
ATTORNEYS Patented Nov. 19, 1929

1,736,089

UNITED STATES PATENT OFFICE

PAUL G. PEIK, OF CHICAGO, ILLINOIS

AUTOMOBILE CONTROL MECHANISM

Application filed April 28, 1927. Serial No. 185,869.

My invention relates to improvements in automobile control mechanisms, and it consists in the combinations, constructions, and arrangements herein described and claimed.

An object of my invention is to provide an automobile control mechanism by means of which the motor is automatically used as a service brake through the operation of the usual control levers in the usual manner.

A further object of my invention is to provide a device of the type described which saves on gasoline and reserves the brakes for emergency use, thus eliminating the wear and tear thereupon. This eliminates the burning of the brakes during steep or mountain driving.

A further object of my invention is to provide a device of the type described which requires less energy in driving, especially through city traffic.

A further object of my invention is to provide a device of the type described which automatically equalizes the brakes through the differential which eliminates carbonization in the motor as the motor carbonizes when idling, and the idling of the motor is reduced to a minimum.

Other objects and advantages will appear in the following specification, and the novel features of the invention will be particularly pointed out in the appended claims.

My invention is illustrated in the accompanying drawings, forming part of this application, in which Figure 1 is a diagrammatic view of an automobile, Figure 2 is a diagrammatic view embodying my invention, and Figure 3 is a side elevation of a portion of an automobile embodying my invention.

In carrying out my invention, I make use of an automobile having a motor 1, a carburetor 2 and an accelerator 3. The accelerator 3 is provided with a contractile spring 4 for normally holding the accelerator away from the floor board 5. The carburetor 2 is provided with a butterfly or throttle valve 6 which is adapted to completely close a passageway 7 in the intake pipe 8. The accelerator 3 is operatively connected to the valve 6 by the usual means shown in the form of a rod 9.

I provide an accelerator-actuating arm 10 which is pivotally mounted at 11 upon any suitable support, such as the floor board 5. The free end of the arm 10 is operatively connected to the accelerator 3 in any suitable manner, such as by a pin 12.

A clutch pedal 13 is similar to the ordinary clutch pedal with only one exception and that is the provision of an actuating cam 14. The cam 14 is made integral with the clutch pedal 13 and is provided with a tapering surface 15 disposed adjacent the arm 10 when the clutch pedal is in normal position. A brake pedal 16 is similar to the ordinary brake pedal with only one exception and that is the provision of a shut-off cam 17 which is relatively large in cross section adjacent the arm 10 when the brake pedal is in normal position. The shut-off cam 17 tapers inwardly from a point adjacent the arm 10 when in normal position.

From the foregoing description of the various parts of the device, the operation thereof may be readily understood. Let us assume that the automobile is in motion and that the driver wishes to stop the automobile. In doing so, the operator presses upon the brake pedal 16 in the ordinary manner in which to apply the brakes. Before the brake pedal is moved a sufficient distance to apply the brakes, the enlarged portion of the cam 17 is moved away from the arm 10 allowing the spring 4 to move the accelerator 3 outwardly, thus actuating the valve 6 so that it will completely cut off communication between the carburetor and the intake manifold. By so doing, the fuel is cut off from the motor and as the motor is operatively connected to the differential and the rear wheels of the automobile, the motor serves as a braking means due to the fact that the rear wheels, to rotate, must actuate the motor. This braking means is sufficient to stop the momentum of the automobile within a relatively short distance from a moderate rate of speed. If the automobile is traveling at a relatively fast rate of speed and the driver unexpectedly is required to stop the momentum of the automobile within a relatively short distance, the brake pedal 16 may be forced in a sufficient distance to apply the brakes.

Just before the automobile comes to a complete stop, the clutch pedal 13 is moved in the usual manner to permit the driver to shift into neutral. The movement of the clutch pedal moves the cam 14 causing the tapering surface 15 to force the arm 10 downwardly against the tension of the spring 4 and moving the valve 6 again into idling position. The momentum of the automobile after the valve 6 is opened to idling position and before the clutch is disengaged is sufficient to again start the motor actuating. By continued movement of the clutch pedal, the clutch is disengaged in the usual manner and the operator may shift into neutral until he is against ready to start the movement of the automobile.

When the automobile is stopped, the brake pedal 16, together with the clutch pedal 13, is released and allowed to move into their normal position. During the movement of the pedals into their normal positions, the cam 17 is moved into engagement with the arm 10 as the cam 14 is moved out of engagement therewith.

It is obvious that the cams 14 and 17 may be provided for a clutch pedal and a brake pedal of any type and used upon any type of automobile for producing the same result without departing from the spirit and scope of the invention.

I claim:

1. The combination with an automobile having a motor, wheels operatively connected to and adapted to be actuated by said motor, a carburetor for supplying fuel to said motor, a valve for controlling the flow of fuel from said carburetor to said motor, of a brake pedal, means operatively connected to said brake pedal for actuating said valve for cutting off the supply of fuel from said carburetor to said motor, whereby the rotation of the wheels will be checked, due to their connection with the motor, a clutch pedal, and means carried by said clutch pedal and adapted to engage with said valve actuating means for moving said valve for allowing a predetermined amount of fuel to pass from said carburetor into said motor.

2. The combination with a carburetor, a motor, a valve for varying the amount of fuel passing from said carburetor into said motor, and an accelerator for actuating said valve, of means for actuating said accelerator for actuating said valve for cutting off the supply of fuel from said carburetor to said motor, and means for actuating said accelerator for actuating said valve for permitting a predetermined amount of fuel to pass from said carburetor to said motor.

3. The combination with an automobile having a motor, wheels adapted to be operatively connected to said motor, a carburetor for supplying fuel to said motor, a valve for varying the amount of fuel passing from said carburetor into said motor, an accelerator, said accelerator operatively connected to said valve, spring means for holding said accelerator outwardly for closing said valve, an arm operatively connected to said accelerator, a brake pedal, and means carried by said brake pedal for actuating said arm for actuating said accelerator for holding said valve in a predetermined position when said brake pedal is in normal position, said spring means being adapted to close said valve when said brake pedal is actuated.

4. The combination with an automobile having a motor, wheels adapted to be operatively connected to said motor, a carburetor for supplying fuel to said motor, a valve for varying the amount of fuel passing from said carburetor into said motor, an accelerator, said accelerator operatively connected to said valve, spring means for holding said accelerator outwardly for closing said valve, an arm operatively connected to said accelerator, a brake pedal, means carried by said brake pedal for actuating said arm for actuating said accelerator for holding said valve in a predetermined position when said brake pedal is in normal position, said spring means being adapted to close said valve when said brake pedal is actuated, a clutch pedal, and means carried by said clutch pedal for engaging said arm for actuating said valve for permitting a predetermined amount of fuel to pass from said carburetor into said motor.

PAUL G. PEIK.